(12) United States Patent
Pugh

(10) Patent No.: US 9,026,900 B1
(45) Date of Patent: May 5, 2015

(54) INVISIBLE OVERLAY FOR DYNAMIC ANNOTATION

(75) Inventor: Scott Pugh, Mountain View, CA (US)

(73) Assignee: Google Inc., Mountain View, CA (US)

( * ) Notice: Subject to any disclaimer, the term of this patent is extended or adjusted under 35 U.S.C. 154(b) by 431 days.

(21) Appl. No.: 13/370,567

(22) Filed: Feb. 10, 2012

(51) Int. Cl.
*G06F 17/24* (2006.01)

(52) U.S. Cl.
CPC ..................................... *G06F 17/24* (2013.01)

(58) Field of Classification Search
USPC ......................................................... 715/227
See application file for complete search history.

(56) References Cited

U.S. PATENT DOCUMENTS

| | | | |
|---|---|---|---|
| 6,028,583 | A | 2/2000 | Hamburg |
| 7,340,673 | B2 | 3/2008 | Malone |
| 7,409,633 | B2 * | 8/2008 | Lerner et al. ................... 715/230 |
| 7,418,656 | B1 | 8/2008 | Petersen |
| 7,954,067 | B2 | 5/2011 | Breglio |
| 7,975,222 | B1 | 7/2011 | Chegini et al. |
| 8,321,470 | B2 * | 11/2012 | Cragun et al. ................. 707/803 |
| 8,606,046 | B2 * | 12/2013 | Bern et al. ..................... 382/294 |
| 2002/0188636 | A1 | 12/2002 | Peck et al. |
| 2003/0081000 | A1 | 5/2003 | Watanabe et al. |
| 2005/0256866 | A1 | 11/2005 | Lu et al. |

OTHER PUBLICATIONS

Amit Agarwal, "Use Google Sidewiki without the Google Toolbar," retrieved from the Internet: http://www.labnol.org/internet/google-sidewiki-without-google-toolbar/9959/, dated 2004-2012, six pages.

Jodi Friedman, "Understanding Layers in Photoshop," retrieved from the Internet: http://digital-photography-school.com/understanding-layers-in-photoshop, dated 2006-2012, four pages.
"Windows 7 Snipping Tool," retrieved from the Internet: http://windows.microsoft.com/is-IS/windows7/products/features/snipping-tool © 2012, retrieved Oct. 12, 2012, two pages, and "Windows Lifecycle Fact Sheet," retrieved from the Internet: http://windows.microsoft.com/en-US/windows/products/lifecycle, dated Jan. 2012, six pages.

* cited by examiner

*Primary Examiner* — Kavita Padmanabhan
*Assistant Examiner* — Tionna Burke
(74) *Attorney, Agent, or Firm* — Sterne, Kessler, Goldstein & Fox P.L.L.C.

(57) ABSTRACT

Methods and systems for dynamically annotating a web-based document are disclosed. An example method includes receiving from a user an indication of a selected portion of a web-based document to be annotated, and receiving a user selection of an editing function to be applied to the document. An annotation window overlaying the selected portion of the document is generated and an annotation to the selected portion of the document using the selected editing function is captured in the overlaid annotation window. The annotation in the overlaid annotation window is mapped to the selected portion of the web-based document underneath the annotation window, and the annotated content and corresponding mapping information are stored in a computing device. Upon receiving a request for the web-based document which has been annotated, the web-based document is provided along with a new overlaid annotation window incorporating the stored annotated content based on the mapping information.

15 Claims, 7 Drawing Sheets

---

Message from Director David Kappos: Public Comments on Proposed Rules Welcomed and Appreciated

The USPTO is working intensively on preparing and internally clearing our various proposed rules for provisions of the America Invents Act that go into effect twelve months from the date of enactment on September 16, 2012 (what the agency refers to as "Group 2" provisions). We are on schedule in assembling our Notices of Proposed Rulemaking, which we intend to release to the public in mid- to late January 2012.

The US innovation community has been of tremendous help to us in this process, submitting much thoughtful input since User:
John D.
Date:
1/05/2012
Comments:
September 16, 2012, enactment for Group 2 provisions.

— 202

— 204

— 202

— 204

Message from Director David Kappos: Public Comments on Proposed Rules Welcomed and Appreciated

The USPTO is working intensively on preparing and internally clearing our various proposed rules for provisions of the America Invents Act that go into effect twelve months from the date of enactment on September 16, 2012 (what the agency refers to as "Group 2" provisions). We are on schedule in assembling our Notices of Proposed Rulemaking, which we intend to release to the public in mid- to late January 2012.

The US innovation community has been of tremendous help to us in this process, submitting much thoughtful input since

FIG. 2A

Message from Director David Kappos: Public Comments on Proposed Rules Welcomed and Appreciated

The USPTO is working intensively on preparing and internally clearing our various proposed rules for provisions of the America Invents Act that go into effect twelve months from the date of enactment on September 16, 2012 (what the agency refers to as "Group 2" provisions). We are on schedule in assembling our Notices of Proposed Rulemaking, which we intend to release to the public in mid- to late January 2012.

The US innovation community has been of tremendous help to us in this process, submitting much thoughtful input since User: John D.
Date: 1/05/2012
Comments: September 16, 2012, enactment for Group 2 provisions.

FIG. 2B

INVISIBLE OVERLAY FOR DYNAMIC ANNOTATION

BACKGROUND

1. Field

The embodiments generally relate to document annotation in a computing environment.

2. Background Art

The World Wide Web (or the "Internet") enables users to create and share documents containing digital contents online. Users can access and manipulate the web-based document through web browsers and other web-based applications. Unlike the physical documents existing on paper or electronic documents rendered by a word processing software, the documents displayed in web browsers are difficult to markup or annotate, for example, by adding a comment, or highlighting a selected portion of the document on the computer screen.

Some screen capture programs attempt to address this issue by taking a screen shot of the content area of interest from a web-based document and copying it into an image or word processing program for markup. However, such conventional programs require manual user maneuvers and lack simplicity and transparency. As a result, they fail to provide the ideal user experience to enable the user to annotate the electronic documents on the internet directly.

BRIEF SUMMARY

Embodiments relate to dynamically annotating a web-based document via a transparent overlay. In an embodiment, an indication is received from a user to annotate a selected portion of a web-based document. An editing function selected by the user to be applied to the document is also received. An annotation window overlaying the selected portion of the document is subsequently generated and an annotation to the selected portion of the document is captured in the overlaid annotation window using the selected editing function. Furthermore, the annotation in the overlaid window is mapped to the selected portion of the web-based document underneath the annotation window. The annotated content, together with its corresponding mapping information describing a relationship of the annotated content with the web-based document, is stored. Accordingly, upon receiving a request for the web-based document which has been annotated, the document is provided along with a new overlaid annotation window, incorporating the stored annotated content based on the mapping information.

In another embodiment, a system for dynamically annotating a web-based document via a transparent overlay includes a document selector, configured to receive from a user an indication of a selected portion of a web-based document to be annotated. The system also includes an edit function selector, configured to receive a user selection of an editing function to be applied to the document. The system further includes an annotation window generator, configured to generate an annotation window overlaying the selected portion of the document. In addition, the system includes an annotation capturer configured to capture an annotation to the selected portion of the document in the overlaid annotation window using the selected editing function and an annotation mapper configured to map the annotation in the overlaid annotation window to the selected portion of the web-based document underneath the annotation window. Moreover, the system includes an annotation storage handler configured to store the annotated content and corresponding mapping information in a computing device, and an annotation displayer configured to provide the web-based document along with a new overlaid annotation window incorporating the stored annotated content based on the mapping information.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described in this application. Such embodiments are presented for illustrative purposes only. Additional embodiments will be apparent to persons skilled in the relevant art(s) based on the information contained in this document.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

FIGS. 2A-2C are illustrations of example display views before and after a user annotates a web-based document using a transparent annotation window, according to an embodiment.

Figure 1:
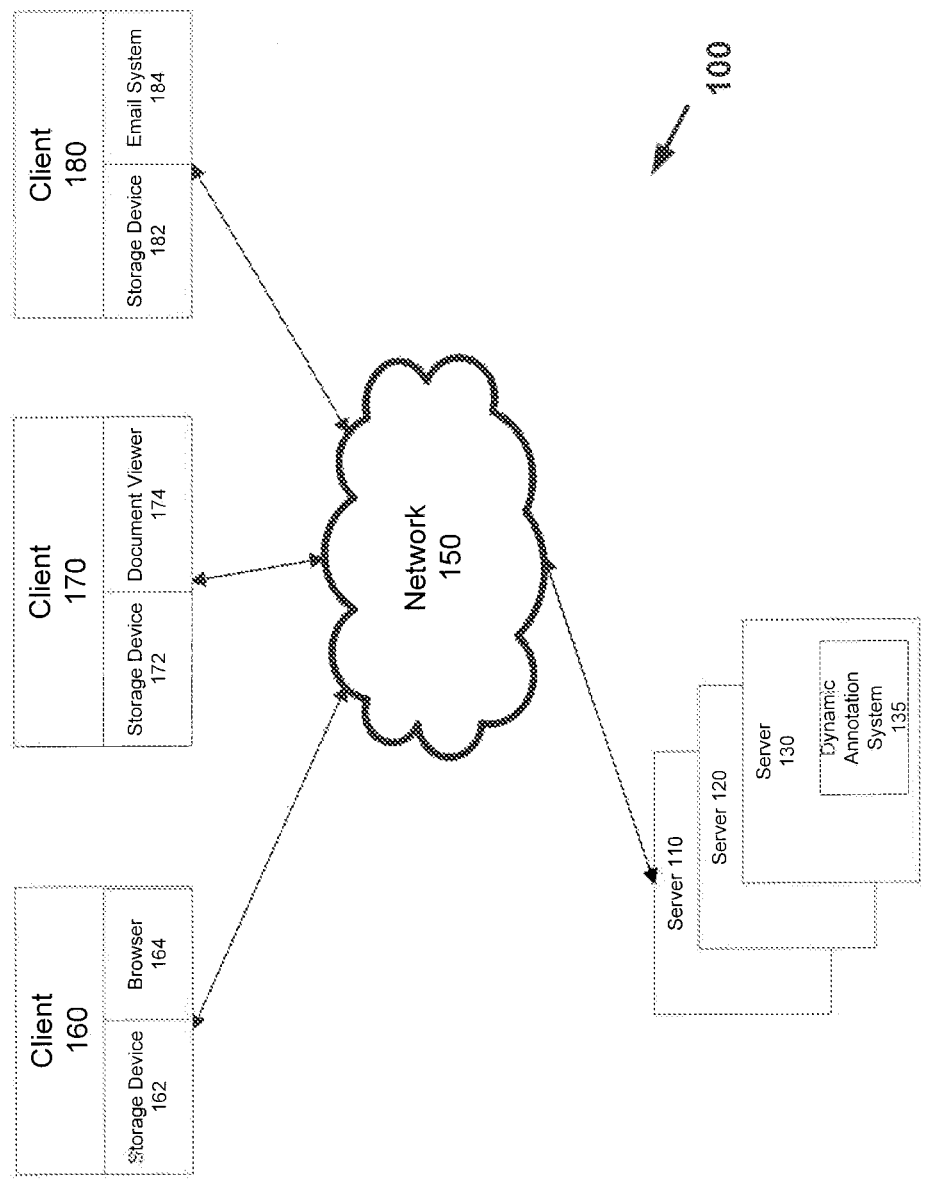
FIG. 1 is a diagram illustrating a system for dynamically annotating a web-based document, according to an embodiment.

The accompanying drawings, which are incorporated herein and form part of the specification, illustrate the embodiments of the present invention and, together with the description, further serve to explain the principles of embodiments and to enable a person skilled in the relevant art(s) to make and use such embodiments.

DETAILED DESCRIPTION

Embodiments relate to dynamically annotating a web-based document using a transparent overlay. Unlike a conventional system which is cumbersome for users to manipulate the electronic content contained in a web-based document, a dynamic annotation system using a transparent overlay, described in the embodiment herein, is capable of receiving an indication from the users to annotate a selected portion of the document with an editing function. The system generates a dynamic annotation window overlaying the selected portion of the document to capture the annotation to the same portion of the document. The system further stores mapping information describing a relationship of the annotated content with the web-based document. Upon receiving a request for the annotated document, a new overlaid annotation window presents the web-based document incorporating the annotated content based on the mapping information.

As will be described in further detail below, embodiments can provide simplicity and transparency to mimic the users' direct manipulation on a physical copy of the document existing on paper. Embodiments can further dynamically generate the annotation overlaid window, thus the annotation window is visible as user scrolls the document. Embodiments can also present the stored annotated content in the new overlaid annotation window, so that the annotated content is modifiable by any user with a proper permission. Moreover, embodiments can reduce document conversion and download times and provide more productive user experience with high-volume file manipulation in a distributed system.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

System

FIG. 1 illustrates a system 100 according to an embodiment. Referring to FIG. 1, system 100 includes servers 110, 120, and 130, a dynamic annotation system 135, a network 150, and clients 160, 170, and 180.

Clients 160, 170 and 180 communicate with one or more servers 110, 120 and 130 over the network 150. Although only servers 110, 120 and 130 are shown, more servers may be used as necessary. Network 150 may be any network or combination of networks that carry data communication. Such network can include, but is not limited to, a local area network, medium area network, and/or wide area network such as the Internet.

Client 160 includes a storage device 162 and a browser 164. Browser 164 may be any application software or program designed to enable users to access, retrieve and view documents and other resources on the Internet. Client 170 includes a storage device 172 and a document viewer 174. Document viewer 174 may be any non-browser based application developed to present and display a web-based document. Client 180 includes a storage device 182 and an email system 184, which may be used to display an electronic document of interest.

Storage devices 162, 172 and 182, which will be described in detail with respect to FIG. 5, can be any device for recording and storing information, which includes but is not limited to flash memory, magnetic tape and optical discs.

Servers 110, 120 and 130 can host dynamic annotation system 135. As illustrated in FIG. 1, clients 160, 170 and 180 can send data requests to servers 110, 120 and 130, which can in turn invoke dynamic annotation system 135 for further processing.

Dynamic annotation system 135 can be software, firmware, or hardware or any combination thereof in a computing device. System 100 can be implemented on or implemented by one or more computing devices. As will be described with respect to FIG. 5, a computing device can be any type of computing device having one or more processors. For example, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O device for communicating over wired or wireless communication link(s).

FIG. 2A is an illustration of an example display view before a user annotates a portion of a web-based document, according to an embodiment. In this example, the electronic content of a web-based document is displayed on a display screen 202 of a computing device. Content area 204 illustrates a selected portion of the document of interest to the user. Accordingly, the dynamic annotation system may receive from the user an indication of a selected portion of a web-based document to be annotated.

The term "web-based document" refers to a representation of an identified information resource over the Internet. In one embodiment, a web-based document may have a Uniform Resource Identifier ("URI".) In response to the HTTP requests, a URI may return a presentation of electronic content of the identified resource in various formats, such as HTML, JPEG or RDF, in a web browser. Alternatively, the content of the web-based document may be represented in a non-browser web application. In another example, the content of the web-based document may be presented in an email application.

After a content area of interest is identified, the user may employ various editing functions of the annotation tool to annotate the selected content. FIG. 2B is an illustration of example display view after a user annotates a web-based document using a transparent annotation window, according to an embodiment.

Referring to FIG. 2B, upon receiving a user selection of an editing function to be applied to the document, a transparent annotation window is generated overlaying the selected portion of the document. For example, in the transparent window overlaying the selected content of interest 204, the user may select an editing function (such as underlining) to be applied to the first sentence of the content. The transparent annotation window may include annotation tools providing regular editing functions such as a typewriter, a highlighter, and a pencil, etc. As illustrated in FIG. 2B, the user may invoke a typewriter to add comments in the annotation window. The annotation window may display the user's name and the date associated with the comments created dynamically.

Once the comments and other selected editing functions have been applied, the overlaid annotation window may capture the corresponding annotation to the selected portion of the document. Indeed, the annotation window may function as if it were a transparent film overlaying the content area 204. Because the annotation has been contained in the annotation window, the underlying document is essentially unchanged. As a result, content area 204 in FIG. 2B in the original document underneath the annotation window is untouched by the user's various manipulations of the content in the annotation window.

Based on their relative positions to each other, the dynamic annotation system maps the annotation in the overlaid window to the selected portion of content area 204 of the web-based document underneath the annotation window. The annotated content, in combination with its corresponding mapping information, may be stored in a local computing device displaying the web-based document. Alternatively, they may be stored in an annotation database residing on a remote server.

Figure 2C:
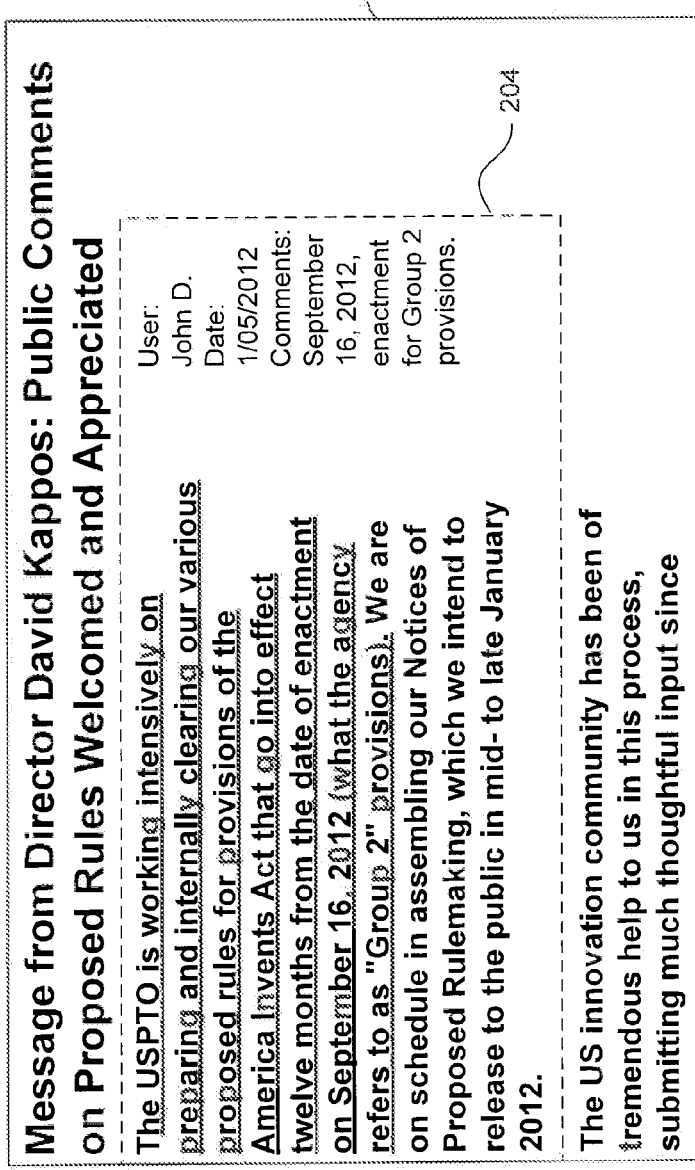

FIG. 2C is an illustration of an example display view presenting an annotated web-based document in a transparent annotation window, according to an embodiment. In the event that an annotated document is requested by the same user or any other users with proper permissions, the dynamic annotation system may generate a new overlaid annotation window using the annotated content. The same document may be provided along with the new overlaid annotation window incorporating the stored annotated content based on the mapping information. For example, when the document is presented on computing device 202, the original underlying web-based document is displayed. In addition, an annotation window overlaying the portion of the document provides the corresponding annotation, such as user name, date, comments and annotating the first sentence of the document. Consequently, due to the transparency of the annotation window, the annotated content appears to be an integral part of the original document.

Figure 3:
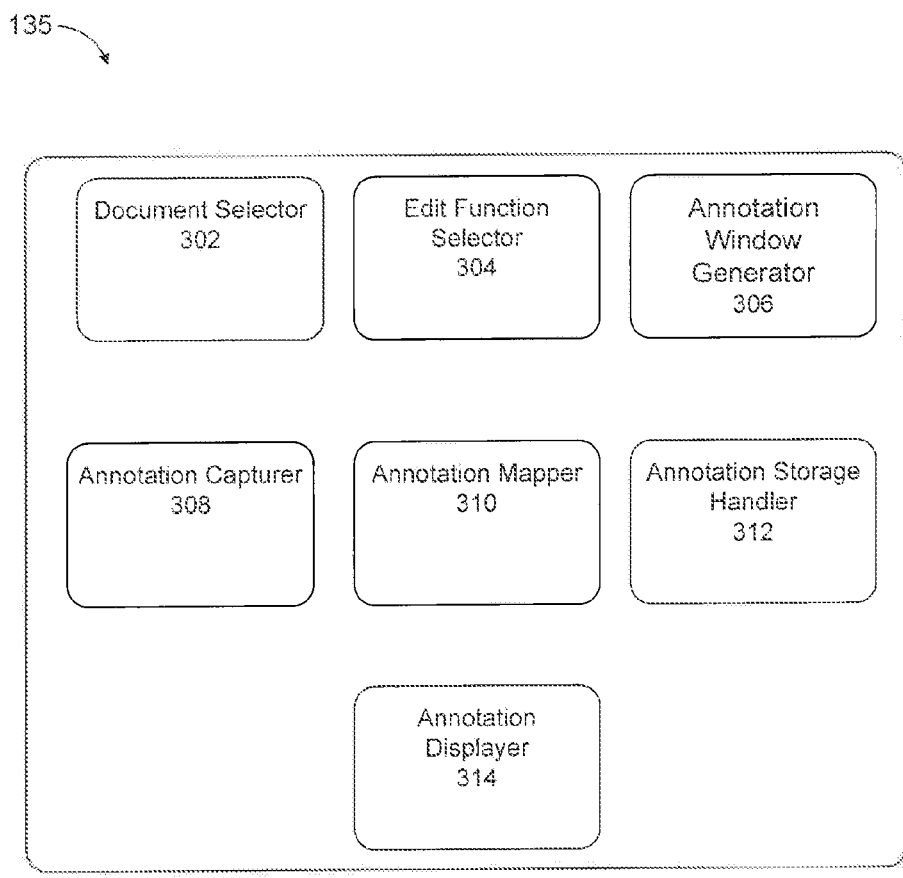
FIG. 3 illustrates elements of the dynamic annotation system, according to an embodiment.

FIG. 3 illustrates elements of a dynamic annotation system 135, according to an embodiment. In the example shown in FIG. 3, dynamic annotation system 135 includes document selector 302, edit function selector 304, annotation window generator 306, annotation capturer 308, annotation mapper 310, annotation storage handler 312 and annotation displayer 314.

Document selector 302 selects a portion of the document to be annotated according to a user indication. When a user request, such as an HTTP request, is received to annotate a portion of the document, document selector 302 can identify the relevant portion of the document. In an embodiment, document selector 302 may be specific to a type of the document. For example, a PDF document selector may be invoked to select content to be annotated for a PDF document. A JPEG document selector may be invoked to select a portion of the image file in JPEG format. In another embodiment, a universal document selector may be able to select a portion of the document to be annotated in any type of web-based document. Document selector 302 may further pass the information regarding the identified portion of the document to annotation window generator 306.

Edit function selector 304 manages annotation tools for adding annotation information by the user. An annotation tool may be any program enabling a user to add, edit, delete, and display an annotation of the web-based document. When edit function selector 304 receives an indication from a user to apply an editing function to the document, a corresponding editing tool is invoked.

Annotation window generator 306 generates an annotation window. Based on the position information identified by document selector 302, the annotation window overlays the corresponding selected portion of the document. Annotation window may further contain annotation tools invoked by edit function selector 304. In one embodiment, the annotation window and annotation tools are made transparent. In another embodiment, users have option to make the annotation window and annotating editing tools visible. In still another embodiment, the annotation window is generated dynamically so that the window is visible on the screen as users scroll the document.

Annotation capturer 308 may capture the annotated content for the annotation window. For example, annotation capturer 308 copies the annotation and its underlying content into the annotation window. Alternatively, annotation capturer 308 only preserves the annotation added by the user using the selected editing function in the annotation window. The relative position of the annotation captured in the window with respect to its corresponding portion of the document may be provided by annotation mapper 310.

Annotation mapper 310 maps the annotation in the overlaid annotation window to the selected portion of the web-based document underneath the annotation window. In one embodiment, annotation mapper 310 utilizes Optical Character Recognition (OCR) to map the annotation in the window to the underlying selected portion of the document. In another embodiment, annotation mapper 310 contains a document divider to further divide the web-based document into a matrix of elements, with each element representing a sub-region of the document. Subsequently, annotation mapper 310 maps the annotation in the overlaid annotation window to one or more elements of the matrix corresponding to the selected portion of the document.

Annotation mapper 310 may employ any of various mapping mechanisms. For example, annotation mapper 310 may use a pixel-by-pixel mapping mechanism to map an annotation in the overlaid window to the underlying selected portion of the document. That is, each pixel of the overlaid annotation window may be mapped to each pixel of the underlying document, so that the pixels in the overlaid annotation window can be displayed properly with respect to the underlying document. Alternatively, annotation mapper 310 may conduct a character by character mapping considering the sequence of characters, lines and curves to best guess at characters that form words. In another example, the mapping may occur at the word, sentence or paragraph level, where a sentence or a paragraph can be identified by an unique string of words contained in the sentence or the paragraph. One skilled in the art can envision several variations to the example mapping mechanism, as described above. Accordingly, a different mapping mechanism may be used in place of the OCR or matrix mapping mechanisms described above.

Annotation storage handler 312 obtains the mapping information from annotation mapper 310 and stores the corresponding annotated content. In an embodiment, annotation storage handler 312 stores the annotated content and its mapping information on the local computing device which displays the annotated document. Alternatively, annotation storage handler 312 may store the annotated content and its mapping information in an annotation database residing on a remote server. In the event a matrix is used by annotation mapper 310, annotation storage handler may also store the matrix information, which describes a relationship of each element of the matrix with a sub-region of the web-based document.

Upon receiving a request for an annotated document, annotation storage handler 312 retrieves the annotated content and corresponding mapping information and passes them to annotation displayer 314. Annotation displayer 314 in turn invokes annotation window generator 306 to generate a new annotation window. Annotation displayer 314 may provide the web-based document along with the stored annotated content based on the mapping information in the new annotation window.

Figure 4:
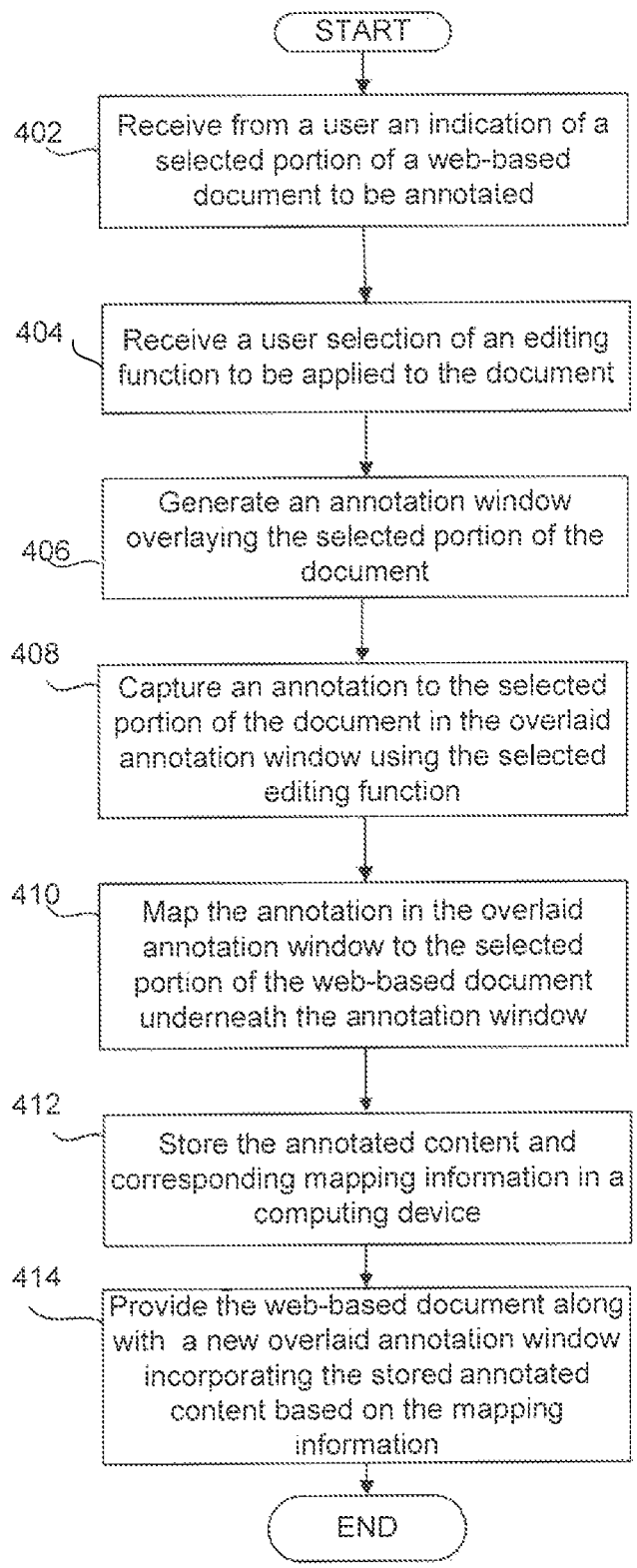
FIG. 4 is a flowchart of a method for dynamically annotating a web-based document using a transparent annotation window, according to an embodiment.

In an example of a variation, embodiments of the elements of dynamic annotation system 135 in FIG. 3, as described herein may be further configured to run in parallel. Such parallel execution of these elements would greatly increase the efficiency and speed of dynamic annotation system 135. Method FIG. 4 is a flowchart of a method for dynamically annotating a web-based document using a transparent annotation window, according to an embodiment. For ease of explanation, the method in FIG. 4 will be described with respect to system 135 of FIG. 3, as described above. However, this method is not intended to be limited thereto.

At stage 402, an indication of a selected portion of a web-based document to be annotated is received from a user. As discussed above, the user may send a HTTP request to annotate a web-based document. The web-based document may be displayed in a browser, an electronic document application, an email system, or other web-based application developed to present and display an electronic document. Document selector 302 may receive and interpret a user request to annotate a selected portion of the document. The user may indicate the position of the annotation by placing the cursor over a selected portion of the document.

At stage 404, a user selection of an editing function to be applied to the document is received. Edit function selector 304 may invoke the corresponding editing tools based on the information contained in the user request. For example, a user may choose a desired annotation editing tool by selecting from a drop down menu.

At stage 406, an annotation window overlaying the selected portion of the document is generated. Annotation window generator 306 may generate the annotation window overlaying the selected portion of the document according to the position information received by document selector 302. In one embodiment, the annotation window may be transparent and without the conventional look of the browser, so the user can better focus on the content of underlying document. In another embodiment, the annotation can be toggled between visible and invisible states according to the user's preferences. The annotation window may contain the annotation tools provided to the user. Alternatively, the annotation tools may be located on the user's display screen outside the annotation window.

According to one embodiment, as the user scrolls the document, the annotation window is generated dynamically and moves with the cursor. The annotation tools are displayed accordingly. As a result, the user can readily point the cursor to a content area of interest and apply the editing function to the content to be annotated.

At stage 408, an annotation to the selected portion of the document using the selected editing function is captured in the overlaid annotation window. In one embodiment, annotation capturer 308 copies the annotated content into the annotation window. Thus, the selected editing function can be applied to the content in the annotation window directly, without changing the document underneath the annotation window. In another embodiment, only the annotation itself, such as a tick mark of a checkbox or a highlight function associated with a text paragraph, is recorded and captured in the annotation window. The annotation window may rely on annotation mapper 310 at stage 410 to specify the location of the annotation to be applied to the corresponding portion of the document underneath the window.

At stage 410, the annotation in the overlaid annotation window is mapped to the selected portion of the web-based document underneath the annotation window. Annotation mapper 310 may map the annotation in the window to the selected portion of the document using several mapping mechanisms.

According to one embodiment, annotation mapper 310 applies the OCR to convert or translate the document into machine-encoded text. The mapping of the annotation to the underlying document can occur at font, word, sentence, or block of text level.

In another embodiment, the mapping may be implemented using a matrix mechanism. For example, the web-based document to be annotated may be divided into a matrix of elements, by a document divider, with each element representing a sub-region of the document. Subsequently, annotation mapper 310 may map the annotation in the overlaid window to one or more elements of the matrix corresponding to the selected portion of the document.

At stage 412, the annotated content and corresponding mapping information, which describes a relationship of the annotated content with the web-based document are stored. Annotation storage handler 312 may store the annotated content and its mapping information in a local or remote computing device.

In the event a matrix mapping mechanism is applied, the matrix information describing a relationship of each element of the matrix with a sub-region of the document may also be stored in a computing device. The relevant mapping information may be stored in a flat file system. Alternative, an annotation database may be used to store the mapping information.

At stage 414, upon receiving a request for the web-based document which has been annotated, the web-based document, along with a new overlaid annotation window incorporating the stored annotated content based on the mapping information is provided. Annotation displayer 314 may provide the document and the annotated content in the new overlaid window based on the mapping information. When the same user or any user with proper permission opens the annotated document, the annotation is displayed seamlessly at the location where it was previously applied in the new annotation window. Accordingly, the users with proper permissions may further manipulate the annotated document in the new annotation window to add their comments and markups.

Example Computer System Implementation

Embodiments shown in FIGS. 1-4, or any part(s) or function(s) thereof, may be implemented using hardware, software modules, firmware, tangible computer readable media having instructions stored thereon, or a combination thereof and may be implemented in one or more computer systems or other processing systems.

Figure 5:
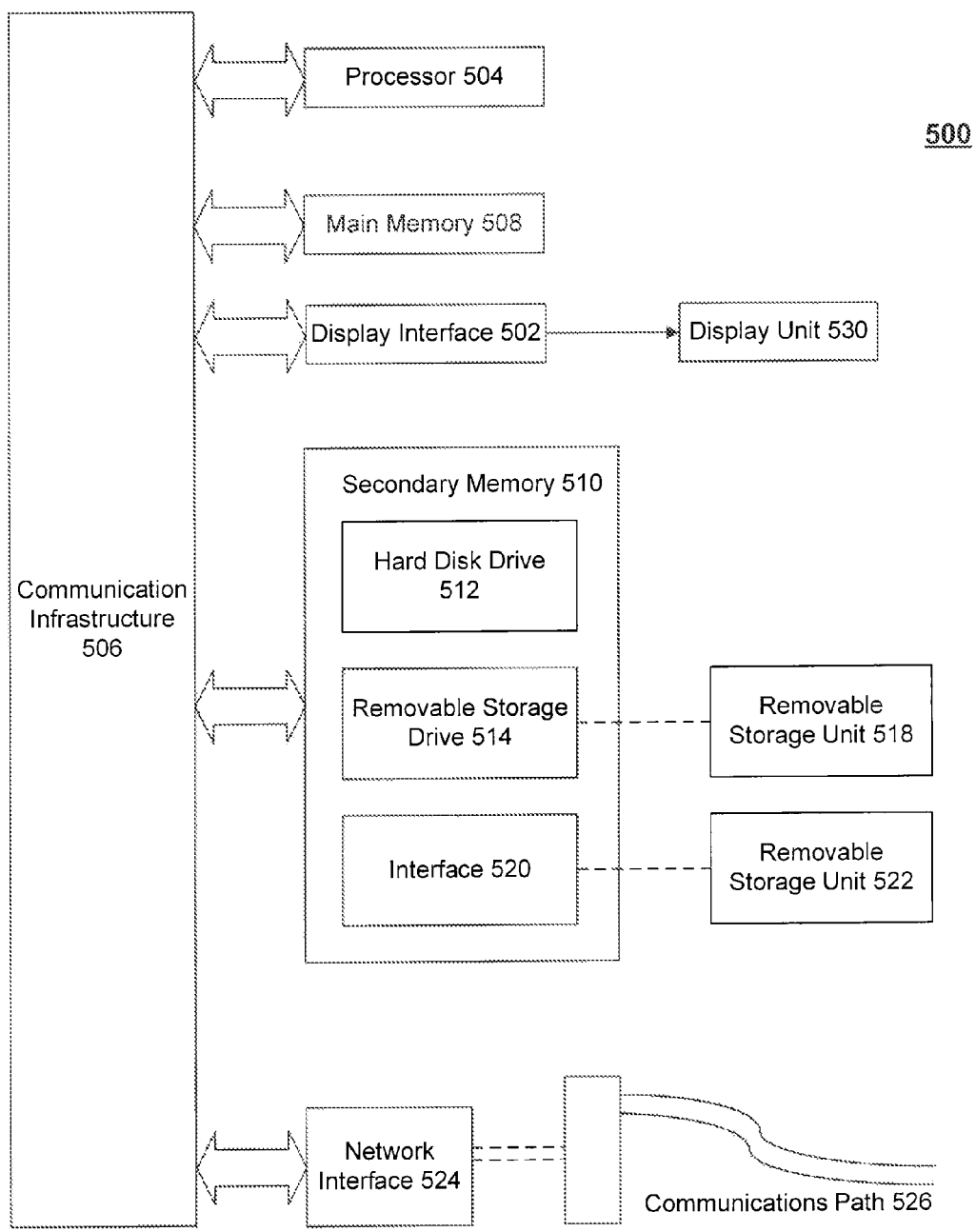
FIG. 5 is a diagram of an example computer system in which embodiments can be implemented.

FIG. 5 illustrates an example computer system 500 in which embodiments, or portions thereof, may be implemented as computer-readable code. For example, dynamic annotation system 135, including its components, as shown in FIG. 3 can be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-3.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 500. After reading this description, it will become apparent to a person skilled in the relevant art how to implement embodiments of the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. which is read by and written to by removable storage drive 514. As will be appreciated by persons skilled in the relevant art, removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a network interface 524. Network interface 524 allows software and data to be transferred between computer system 500 and external devices. Network interface 524 may include a modem, a network interface (such as an Ethernet card), a communications port, a PCMCIA slot and card, or the like. Software and data transferred via network interface 524 may be in the form of signals, which may be electronic, electromagnetic, optical, or other signals capable of being received by network interface 524. These signals may be provided to network interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via network interface 524. Such computer programs, when executed, enable computer system 500 to implement embodiments as discussed herein. In particular, the computer programs, when executed, enable processor device 504 to implement the processes of embodiments of the present invention, such as the stages in the method illustrated by flowchart of FIG. 4, discussed above. Accordingly, such computer programs represent controllers of the computer system 500.

Embodiments of the invention also may be directed to computer program products comprising software stored on any computer useable medium. Such software, when executed in one or more data processing device(s), causes a data processing device(s) to operate as described herein. Embodiments of the invention employ any computer useable or readable medium. Examples of computer readable mediums include, but are not limited to, primary storage devices (e.g., any type of random access memory), and secondary storage devices (e.g., hard drives, floppy disks, CD ROMS, ZIP disks, tapes, magnetic storage devices, and optical storage devices, MEMS, nano-technological storage device, etc.), and non-storage communication mediums (e.g., wired and wireless communications networks, local area networks, wide area networks, intranets, etc.).

CONCLUSION

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for dynamically annotating a web-based document comprising:
   receiving from a user an indication of a selected portion of a web-based document to be annotated;
   receiving a user selection of an editing function to be applied to the web-based document;
   generating an annotation window, the annotation window being an overlay on the selected portion of the web-based document and including one or more annotations to the selected portion of the web-based document;
   copying annotatable content of the selected portion of the web-based document into the annotation window;
   capturing an annotation to the selected portion of the web-based document in the annotation window using the selected editing function;
   dividing the web-based document into a matrix of elements, wherein each element represents a sub-region of the web-based document;
   generating mapping information by mapping the annotation in the annotation window to one or more elements of the matrix corresponding to the selected portion of the web-based document;
   storing the annotation and the mapping information; and
   upon receiving a request for the annotated web-based document, providing the web-based document along with a new annotation window incorporating the stored annotation based on the mapping information,
   wherein the receiving from a user an indication, the receiving a user selection, the generating, the copying, the capturing, the dividing, the mapping, the storing, and the providing are implemented by one or more computer devices.

2. The computer-implemented method of claim 1, wherein the storing the annotation and mapping information further comprises:
   storing a matrix information in a computing device, wherein the matrix information describes a relationship of each element of the matrix with a sub-region of the web-based document.

3. The computer-implemented method of claim 2, wherein the storing the annotation and the mapping information further comprises:
   storing the annotation, the mapping information, and the matrix information in an annotation database.

4. The computer-implemented method of claim 1, wherein the mapping the annotation in the annotation window comprises:
   mapping the annotation in the annotation window to the selected portion of the document using optical character recognition.

5. The computer-implemented method of claim 1, wherein the stored annotated content incorporated in the new annotation window is modifiable by any user with a proper permission.

6. The computer-implemented method of claim 1, wherein the new annotation window is transparent to the user.

7. The computer-implemented method of claim 1, wherein the annotation window is dynamically generated and is visible as the user scrolls the document.

8. A system for dynamically annotating a web-based document, comprising:
   one or more computing devices comprising a processor and a memory;
   a document selector, implemented by the one or more computing devices, configured to receive from a user an indication of a selected portion of a web-based document to be annotated;
   an edit function selector, implemented by the one or more computing devices, configured to receive a user selection of an editing function to be applied to the document;
   an annotation window generator, implemented by the one or more computing devices, configured to generate an annotation window, the annotation window being an overlay on the selected portion of the web-based document and including one or more annotations to the selected portion of the web-based document;
   an annotation capturer, implemented by the one or more computing devices, configured to:
   copy annotatable content of the selected portion of the web-based document into the annotation window; and
   capture an annotation to the selected portion of the web-based document in the annotation window using the selected editing function;
   a document divider, implemented by the one or more computing devices, configured to divide the web-based document into a matrix of elements, wherein each element represents a sub-region of the web-based document;
   an annotation mapper, implemented by the one or more computing devices, configured to map the annotation in the annotation window to one or more elements of the matrix corresponding to the selected portion of the web-based document;
   an annotation storage handler, implemented by the one or more computing devices, configured to store the annotation and the mapping information; and
   an annotation displayer, implemented by the one or more computing devices, configured to provide the web-based document along with a new annotation window incorporating the stored annotation based on the mapping information, upon receiving a request for the annotated web-based document.

9. The system of claim 8, wherein the annotation storage handler is further configured to store a matrix information in a computing device; and wherein the matrix information describes a relationship of each element of the matrix with a sub-region of the web-based document.

10. The system of claim 9, wherein the annotation storage handler is further configured to store the annotation, the mapping information, and the matrix information in an annotation database.

11. The system of claim 8, wherein the annotation handler is further configured to map the annotation in the annotation window to the selected portion of the document using optical character recognition.

12. The system of claim 8, wherein the stored annotated content incorporated in the new annotation window is modifiable by any user with a proper permission.

13. The system of claim 8, wherein the new annotation window is transparent to the user.

14. The system of claim 8, wherein the annotation window is dynamically generated and is visible as the user scrolls the document.

15. An apparatus comprising a non-transitory computer readable storage medium having instructions encoded thereon that, when executed by a processor, cause the processor to perform operations comprising:
   receiving from a user an indication of a selected portion of a web-based document to be annotated;
   receiving a user selection of an editing function to be applied to the web-based document;
   generating an annotation window, the annotation window being an overlay on the selected portion of the web-based document and including one or more annotations to the selected portion of the web-based document;
   copying annotatable content of the selected portion of the web-based document into the annotation window;

capturing an annotation to the selected portion of the web-based document in the annotation window using the selected editing function;

dividing the web-based document into a matrix of elements, wherein each element represents a sub-region of the web-based document;

generating mapping information by mapping the annotation in the annotation window to one or more elements of the matrix corresponding to the selected portion of the web-based document;

storing the annotation and the mapping information; and upon receiving a request for the annotated web-based document, providing the web-based document along with a new annotation window incorporating the stored annotation based on the mapping information, wherein the receiving from a user an indication, the receiving a user selection, the generating, the copying, the capturing, the dividing, the mapping, the storing, and the providing are implemented by one or more computer devices.

* * * * *